Patented Dec. 15, 1936

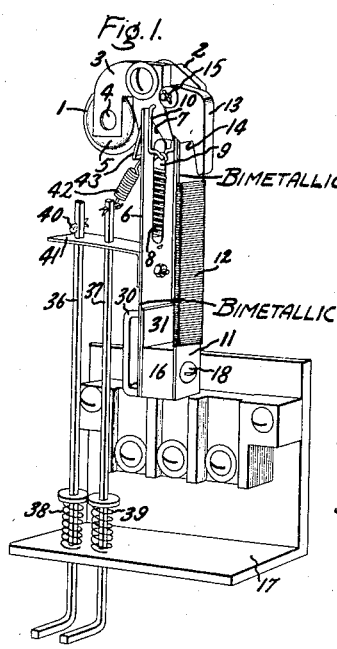
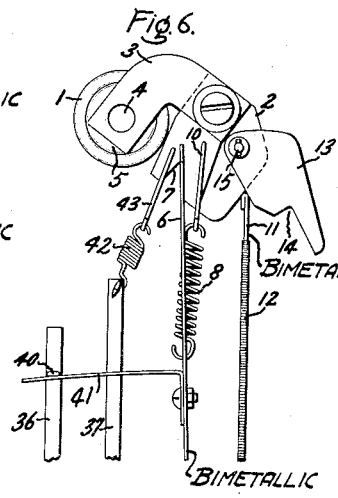
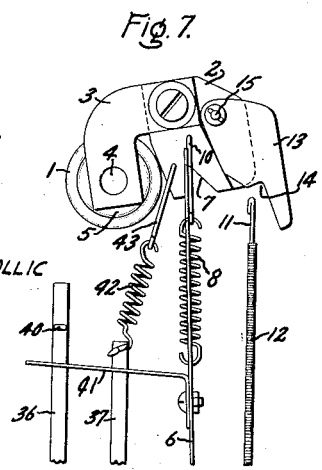
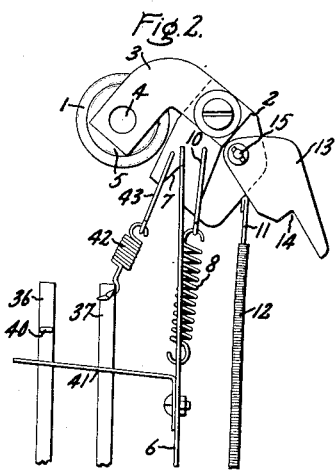
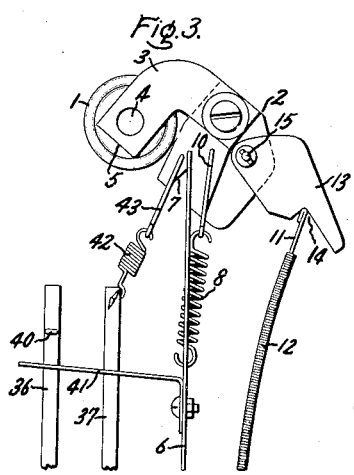
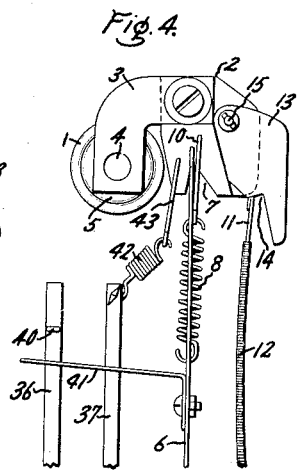

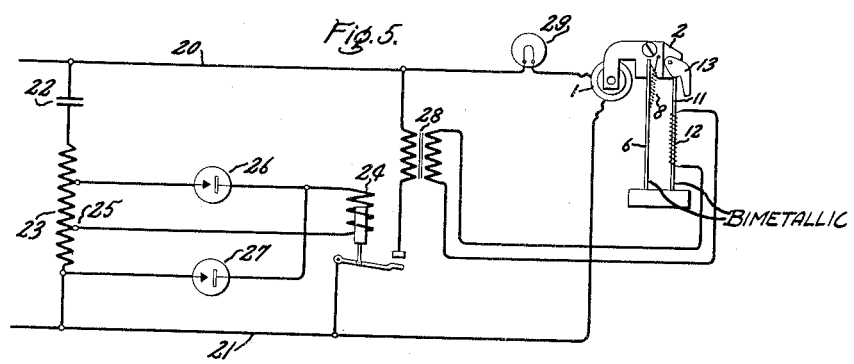
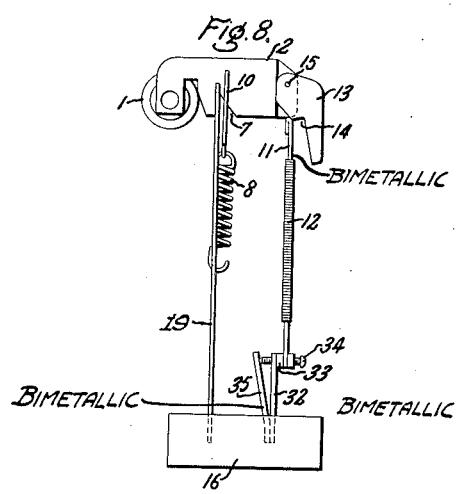

2,064,644

UNITED STATES PATENT OFFICE 2,064,644

CONTROL DEVICE

John L. Woodworth, Schenectady, N. Y., assignor to General Electric Company, a corporation of New York Application May 28, 1935, Serial No. 23,847

14 Claims. (Cl. 200—122)

My invention relates to control devices, and more particularly to control devices of the type in which desired control operations are selectively effected in response to current impulses of different durations. It has for one of its objects to provide an improved mechanical arrangement of elements whereby a control member such, for example, as an electric switch may be selectively operated from one position to another from a remote point in response to different durations of energization of a receiving electroresponsive device.

One form of device for accomplishing the above purpose comprises a switch control member adapted to be actuated between two positions by a thermostatic member which is energized by a heater connected across a supply source and controlled in movement by variations in the time interval of received high-frequency current impulses. Experience has shown that voltage variations of the heater current supply source and ambient temperature changes of the media surrounding the thermostatic member may cause the thermostatic member to be energized by a selected signal to impart an undesired actuation to the switch control member.

It is, therefore, a further object of my invention to provide an improved mechanical arrangement of the above-described type having embodied therein an ambient temperature compensating means for insuring the proper actuation of the switch control member in response to a transmitted signal of a preselected interval.

In certain carrier current installations having a current impulse responsive actuating relay of the above-described type it is necessary to provide manually operable means for moving the switch control member between its two positions. Thus, in those cases where the relay is used to control street lamps, for example, and the controlled lamp burns out, a manually operable means is necessary positively to determine whether the fault is in the relay or in the lamp. The automatic operation of the relay in response to current impulse actuation may be quite delicate in nature and, accordingly, it it necessary that the manually operable controlling means be completely disengaged from the component parts of the mechanism during such automatic operation, for otherwise the relay may fail to operate in the desired manner in response to a received current impulse of a predetermined duration.

Accordingly, an additional object of my invention is to provide an ambient temperature compensated current impulse operated relay which includes co-operating manually operable means of novel construction for manually operating the switch control member between its two operating positions.

A still further object of my invention is to provide an improved relay having the above characteristics in which the manually operable means is completely disengaged from the working parts of the device during the automatic operation thereof, thereby to insure unrestricted and accurate response of the relay to a signal current transmited for a preselected interval.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which Fig. 1 shows an embodiment of my improved control device; Figs. 2, 3 and 4 illustrate the operating steps corresponding to automatic operation of the device in response to signal current impulses of predetermined duration; Fig. 5 shows a circuit having my improved control device connected therein; Figs. 6 and 7 illustrate the sequence of operating steps resulting from an actuation of the manual control means, and Fig. 8 shows a modified arrangement of certain of the elements of my improved control device.

Referring to Fig. 1 of the drawings, I have shown my improved control device in which a switch 1 is arranged to operate reciprocally between its open and closed position in selective response to received impulses of different durations. The switch 1 is of the liquid contact type and is mounted on a carrier or control member 2 by means of spring clips 3 having apertures 4 therein which engage portions of the metal hemispheres 5 forming a part of the switch.

The switch 1 is completely described in copending application, Serial No. 759,527 to John H. Payne, Jr., filed December 28, 1934, and assigned to the same assignee as the present application. Briefly, the switch comprises a pair of metallic hemispheres 5 separated by a fillet of thermoplastic insulating material which is fusion welded to the rims of the two hemispheres thereby to seal the container thus formed. A body of conducting material is sealed within the hemispheres and serves to make and break the electric circuit therebetween through an aperture in the fillet of insulating material when the switch is moved between two operating positions.

The control member 2 is provided in its under surface with an inverted V-shaped notch 7 which fits over the upper end of a resilient mounting member 6 to form a pivot. The member 2 is biased for clockwise movement about its pivot by means of a spring 8 which lies in an elongated slot 9 in the resilient member 6, one end of the spring being attached to the member 6 at the lower end of the slot, and the other end being attached by means of a yoke 10 to the member 2 at a point slightly to the right of the pivot point. Thus, the member 2 is biased for clockwise movement, but in the position shown it is restrained against such movement by reason of the fact that its right lower corner portion rests upon the upper end of an actuating thermostat 11. A heating coil 12 is provided for actuating the element 11 from its normal unflexed position to a flexed position. A reset trigger 13 having a notch 14 therein and pivoted at 15 on the control member 2, co-operates with the free end of the element to move the control member between its two operating positions in a manner to be described hereinafter. The resilient mounting member 6 and the thermostatic element 11 are mounted on the supporting block 16 forming a part of the base 17 by means of a bolt 18 and a nut (not shown).

The operation of the device as thus described may best be understood by reference to Figs. 2, 3, and 4, wherein the device is shown in its different operating positions. In Fig. 2, the position of the elements of the mechanism is shown after the free end of the actuating thermostat 11 has moved to the right in response to energization of its heating winding 12 for a short interval. It will be observed that the short deflection of the element 11 to the right is sufficient to actuate the free end thereof from beneath the right lower corner portion of the member 2, thereby permitting the control member 2 to move in a clockwise direction about its pivot. This may, if desired, correspond to the closed position of the switch 1. If the element 11 now be permitted to cool, no further actuation of the mechanism occurs and the device remains in the position shown.

With the mechanism in the position shown in Fig. 2, if the element 11 be heated to a greater extent, as by a relatively long energization of the heating winding 12, it deflects from the position shown in Fig. 2 to the position shown in Fig. 3, or beyond. If the element 11 be now permitted to cool, it deflects to the left and engages the notch 14 of the trigger member 13 thereby to pivot the control member 2 in a counterclockwise direction. The member 2 is actuated by such counterclockwise motion through the position shown in Fig. 4 to its original position as illustrated in Fig. 1. In Fig. 4, the device is shown just prior to a completion of its return movement. It will be seen that the end of the element 11 is about to leave the notch 14 and to again slip under the right lower corner portion of the member 2 where it again restrains that member against clockwise movement.

It will be observed that the upper extremity of the resilient member 6 forms a knife-edge support and pivot for the control member 2, and that the sides of the notch 7 co-operate with the two flat sides of the element 6 to form stops for limiting the movement of the member 2 about this pivot between its two positions. In order to retain the member 2 in position on the extremity of the resilient element 6, the last-named element is notched at its end, thereby to provide upwardly extending tabs which engage either side of the member 2 in the manner illustrated.

It will further be observed that the yoke 10 is pivotally connected to the member 2 at a point slightly above and closely adjacent the knife-edge bearing. With this arrangement the force required to move the member 2 against the bias of the spring 8 is a minimum when the member 2 is in the position shown in Fig. 1, and a maximum when the control member is in the position shown in Fig. 2. This follows from the fact that the lever arm of the applied biasing force decreases as the member 2 moves from the position of Fig. 2 to the position of Fig. 1. This is important to the satisfactory operation of the device for the reason that as the free end of the element 11 approaches the position shown in Fig. 4 during a cooling interval, the force exerted by the element 11 decreases. However, by locating the pivot point of the yoke 10 in the manner described this decrease in the force exerted by the free end of the element 11 is accompanied by a proportional decrease in the biasing force of the spring 8 thereby insuring the positive and complete operation of the mechanism from the position shown in Fig. 2 to the position shown in Fig. 1.

It is desirable in certain applications of utility that the device described control the position of the switch 1 by means of high frequency current transmitted over a power supply circuit. I have shown such a circuit arrangement in Fig. 5, wherein the energization of the heating coil 12 is controlled in response to high frequency current impulses received from the power lines 20 and 21. The received high frequency impulses are impressed on a tuned circuit comprising a condenser 22 and an inductance 23 connected between the two power supply conductors. The winding of a relay 24 is connected between a point 25 on the inductance 23 and two additional points on opposite sides of the point 25 through rectifiers 26 and 27 respectively, these rectifiers being so polarized that unidirectional current is supplied through the winding of the relay during both half cycles of the alternating electromotive force appearing across the inductance 23. Rectifiers 26 and 27 may be of any suitable construction but preferably are rectifiers of the copper oxide contact type as shown, for example, in Patent No. 1,640,335, to Lars O. Grondahl, issued August 23, 1927. The relay 24 controls the energization of a transformer 28 connected between the lines 20 and 21, which in turn controls the energization of the heating coil 12 of the relay shown in Fig. 1. Selective energization of the heating coil 12 causes flexure of the thermostatic element 11 selectively to operate the switch 1 between its open and closed positions and thereby energize or de-energize the load circuit including the load 29. The load 29 is shown by way of example as a lamp, but may comprise any other suitable load device, such as a water heater or the like.

With the above-described circuit arrangement, heating of the thermostatic element 11 by the coil 12 in response to received signal currents is controlled in the manner described below. When a short high frequency current impulse is received, causing energization of relay 24, transformer 28 and the heating coil 12, heat is applied to the thermostatic member 11, causing this member to flex slightly to the right, thereby to remove the upper free extremity of the member 11 from beneath the right lower portion of the carrier member 2 and allow the member 2 to be snapped under the force of the spring 8 to the position illustrated in Fig. 2. If the received carrier energy be now interrupted, the control member 2 remains in this position, thereby leaving the circuit including the load 29 in an energized condition.

When it is desired to de-energize the circuit, including the load, carrier energy is supplied to the power circuit for a longer period than was required for the purpose of actuating the switch 1 to energize the load circuit. This causes the member 11 to be flexed to the right to the position shown in Fig. 3 where the upper extremity of the member 11 engages the notch 14 in the trigger member 13 in the manner previously described. If the carrier energy is now interrupted, the member 11 will cool and flex to the left, thus returning the carrier member to its original position as shown in Fig. 1, where the upper extremity of the member 11 re-engages the right lower corner portion of the carrier member 2.

It has been found from experience that in a relay of the above-described construction it is essential that ambient temperature compensating means be provided to prevent undesired tripping of the control member 2 in the absence of a signal current impulse and to prevent improper actuation of the control member in response to a signal impulse of a predetermined duration. In accordance with the preferred form of my invention, I provide such ambient temperature compensation by making the resilient element 6 of bi-metal and arranging the element so that the free end thereof, upon which the control member 2 is wholly supported, moves in the same direction as the thermostatic element 11. By a proper selection of materials and proper adjustment, the free ends of the two elements may be made to move together so that the point of engagement between the right lower corner portion of the control member 2 and the free extremity of the actuating thermostatic element 11 is substantially unchanged during ambient temperature fluctuations over wide ranges. An adjusting means comprising a U-shaped member 30, a stiff resilient backing strip 31, and the screw 18 is provided for changing the relative positions of the two elements 6 and 11 thereby to change the energization periods necessary to actuate the switch control member between its two operating positions.

While the above-described compensating arrangement is preferable, other compensating devices may be employed. Thus in Fig. 8 I have shown the thermostatic element 11 mounted on the free end of a compensating thermostatic element 32 which is fixedly mounted at its other end on the support 16. In this modification the control member 2 is pivotally mounted on the free end of a monometallic resilient member 19. The mounting arrangement of the element 2 on the resilient member 19 is identical with that described in connection with Fig. 1 of the drawings. A member 33 of heat insulating material is inserted between the connected ends of the elements 11 and 32 to prevent the conduction of heat to the element 32 when the heating coil 12 is energized. An adjusting screw 34 is provided which is threaded through the heat insulating member 33 and engages the free end of a second compensating thermostat 35 having its other end fixedly mounted in the support 16. In the preferred construction of this arrangement, the ends of the elements 19, 32, and 35 are molded into the molded supporting block 16 thereby eliminating the use of assembly screws and bolts. As thus arranged, and during ambient temperature changes, the free ends of the elements 32 and 35 move in a direction opposite to the direction of movement of the free end of the element 11. By a proper proportioning of the lengths of the element 11 and the elements 32 and 35, the point of engagement between the upper free extremity of the element 11 and the right lower corner portion of the control member 2 remains substantially unchanged during such ambient temperature changes.

In a relay of the above-described type it is desirable to provide, for testing and other purposes, manually controlled means for operating the switch 1 between its two positions. Since the working parts of the relay are necessarily enclosed in a casing to exclude dirt and moisture therefrom, it is convenient and desirable to have the manually operable members, which are connected to operate the switch control member, extend outside the casing. In the arrangement shown in Figs. 1 to 7, for example, all of the parts shown above the base 17 are enclosed in a casing which for purposes of clarity has been omitted from the drawings. To satisfy the above requirement I provide a pair of operating rods 36 and 37, which are mounted as shown in Fig. 1, and which are normally maintained in a fixed position by springs 38 and 39 and cotter pins (not shown) which engage the under side of the support base 17. The rod 36 is provided at its upper end with a pin 40 arranged to engage a resilient member 41 mounted on the thermostatic member 6, when the rod is pulled downwardly against the spring 38. Normally the pin 40 is completely disengaged from the resilient member 41. The second rod 37 extends through an aperture in the resilient member 41 and is yieldingly connected to the control member 2 by means of a spring 42 and a yoke 43, which is pivotally mounted on the member 2 at a point adjacent the knife-edge bearing.

The sequence of operating steps to actuate the control member 2 between its two positions by the operating rods 36 and 37 is illustrated by Figs. 1, 6 and 7. When it is desired to actuate the control member 2 from the position shown in Fig. 1 to the position shown in Fig. 6 the rod 36 is pulled downwardly against the bias of the spring 38 until the pin 40 engages the resilient member 41, thereby shifting the resilient member 6 and the member 2 to the left until the upper extremity of the member 11 is removed from beneath the right lower corner portion of the member 2. With the mechanism in this position, to re-establish the switch position shown in Fig. 1, the rod 37 is pulled downwardly against the bias of the spring 39 and the member 2 is returned to its original position by the pull exerted thereon through the spring 42 and the yoke 43. The spring 42 is made sufficiently stiff to pull the control member from the position shown in Fig. 6 to the position shown in Fig. 7 and yet possess sufficient resiliency to protect the device against sudden jerks on the operating rod 37 which might otherwise affect the adjustment of the mechanism.

It will be noted that in the normal positions of the rods 36 and 37 they are substantially completely disengaged from the remaining elements of the mechanism due to the upward biasing effect of the springs 38 and 39. Such disengagement is essential to the satisfactory automatic operation of the device in eliminating any restriction or drag on the operating parts thereof during the operation of the device in response to signal current impulses.

By constructing the member 6 of resilient bi-metal and entirely supporting the control member 2 thereon, I provide a convenient arrangement wherein ambient temperature compensation is effected, ease of adjustment is enhanced, and manual operation is facilitated. In this connection it will be noticed that the member 6 performs the dual function of compensating the device for ambient temperature changes and of operating as an element in the manually operable control mechanism.

While the use of a compensating bi-metal member 6 is preferable, the compensating arrangement illustrated in Fig. 8 has been found to be highly satisfactory. In this arrangement the member 35 and the adjusting screw 34 are necessary elements of the adjusting mechanism. By making the member 32 of bi-metal, smooth compensation over wide ambient temperature ranges is obtained irrespective of the setting of the adjusting screw 34. The second bi-metal member 35 maintains substantially the same relative biasing force between the free ends of the elements 32 and 35 regardless of the ambient temperature and thereby insures the desired smooth compensation.

In my improved control device all delicate adjustments are eliminated from the mechanism, thereby reducing the cost of construction and increasing the reliability of operation. In addition, the operating parts are so arranged and constructed that undesired operation due to mechanical vibration and jars is prevented.

While I have shown particular embodiments of my invention, it will of course be understood that I do not wish to be limited thereto, since many modifications in the structure may be made, and I contemplate by the appended claims to cover all such modifications as fall within the true spirit and scope of my invention.

What I claim as new and desire to secure by Letters Patent of the United States is:

1. In combination, a resilient thermostatic element having a free end, a control member wholly supported on the free end of said thermostatic element and arranged to pivot about said free end between two positions, a second thermostatic element arranged for different degrees of movement dependent upon the duration of application of heat thereto, said first and second thermostatic members being arranged to move together in response to ambient temperature changes, means for applying heat to said second thermostatic element to cause relative movement between said thermostatic elements, means whereby in response to a certain degree of movement of said second thermostatic element said control member is actuated from one position to the other, and in response to a greater degree of movement of said second thermostatic element said member is actuated from said other position to the first position, and manually controlled means normally released from but arranged to be connected respectively to said resilient member and said control member thereby to move said control member between said two positions.

2. In combination, a resilient member having a free end, a control member wholly supported on the free end of said resilient member and movable between two positions, means for biasing said control member to the second of said positions, a thermostatic element having an end engaging said control member to normally hold said control member against said biasing means in the first of said positions, means including said thermostatic element for moving said control member between said two positions, an operating member normally released from but arranged to be connected to said resilient member thereby to disengage said control member from said thermostatic element to permit said control member to move from said first position to said second position, and a second operating member normally released from but arranged to be resiliently connected to said control member thereby to actuate said control member from said second to said first position.

3. In combination, a resilient member having a free end, a control member wholly supported on the free end of said resilient member and movable between two positions, means for biasing said control member to the second of said positions, a thermostatic element having an end engaging said control member normally to hold said control member against said biasing means in the first of said positions, means including said thermostatic element for moving said control member between said two positions, manually operable means for causing relative movement between said resilient and thermostatic elements thereby to disengage said control member from said thermostatic element to permit said control member to move from said first to said second position, and an operating member normally released from but arranged to be resiliently connected to said control member thereby to actuate said control member from said second to said first position.

4. In combination, a resilient member fixedly mounted at one end and free at its other end, a thermostatic element fixedly mounted at one end and having a free end adjacent the free end of said resilient member, a control member wholly supported on said resilient member and movable between two positions, said control member having a portion thereof normally engaging the free end of said thermostatic element, means for maintaining the point of engagement between the free end of said thermostatic element and said control member substantially the same during ambient temperature changes, means including said thermostatic element for moving said control member between said two positions, and manually controlled means normally released from but arranged to be connected respectively to said resilient member and said control member for moving said control member between said two positions.

5. In combination, a supporting member, a pair of bi-metallic elements fixedly mounted on said supporting member and having free ends, and a control member wholly supported on the free end of one of said elements and having a portion engaging the free end of the other of said elements, said control member being movable from either one of two positions to the other of said two positions in response to relative movement between the free ends of said elements, the free ends of said elements being arranged to move together in the same direction in response to like temperature variations thereby to maintain the point of contact between said control member and said other of said elements substantially unchanged during ambient temperature changes.

6. In combination, an actuating thermostatic member, a compensating thermostatic member, said members having free ends which move together in the same direction in response to ambient temperature changes, a control member wholly supported on the free end of said compensating thermostatic member and pivotally movable about said free end between two positions, and means including said actuating thermostatic member for moving said control member between said two positions.

7. In combination, a resilient member fixed at one end and free at its other end, a control member wholly supported on the free end of said member and movable between two positions, a compensating thermostatic element fixedly mounted at one end, an actuating thermostatic element mounted on said compensating thermostatic element and having a free end normally engaging said control member, said thermostatic elements being arranged to move in opposite directions in response to ambient temperature changes thereby to maintain the point of engagement between said control member and said actuating thermostatic element unchanged during such ambient temperature changes, and means including said actuating thermostatic element for moving said control member between said two positions.

8. In combination, a resilient member having a free end, a second member mounted on and extending at an angle from said resilient member, a control member wholly supported on the free end of said resilient member and movable between two positions, means including a thermostatic element for moving said control member between said two positions, means including a manually operable member normally disengaged from said second member but operable to engage said member thereby to move said control member from one position to the other position, and a second manually operable member normally released from but arranged to be resiliently connected to said control member thereby to move said control member from said other position to said first position.

9. In combination, a resilient member having a free end, a second member mounted on and extending at an angle from said resilient member, a control member wholly supported on the free end of said resilient member and movable between two positions, means including a manually operable member normally disengaged from said second member but operable to engage said member thereby to move said control member from one position to the other position, and a second manually operable member normally released from but arranged to be resiliently connected to said control member thereby to move said control member from said other position to said first position.

10. In a control device, a control member operable between two positions, means including an actuating member for operating said control member between said positions, and a combined adjusting and temperature compensating means comprising a pair of thermostatic elements having free ends movable in the same direction under like temperature changes, and adjusting means for variably separating the free ends of said elements.

11. In a control device, a control member operable between two positions, a pair of thermostatic elements having free ends movable together under like temperature changes, an adjusting screw for biasing said free ends apart, and means including an actuating member mounted on the free end of one of said elements for operating said control member between said two positions.

12. In combination, a resilient member having a free end, a control member wholly supported on the free end of said resilient member and movable between two positions, means including a manually operable member normally disconnected from said resilient member but operable to be connected to said member thereby to move said control member from one position to the other position, and a second manually operable member normally released from but arranged to be connected to said control member thereby to move said control member from said other position to said first position.

13. In a control device, a combined adjusting and temperature compensating means comprising a pair of thermostatic elements having free ends movable in the same direction under like changes in temperature, adjusting means for variably separating the free ends of said elements, and an actuating member mounted on one of said elements.

14. In combination, a resilient member fixed at one end and free at its other end, a control member wholly supported on said member and movable between two positions, said control member being biased to the second of said two positions, a compensating thermostatic element fixedly mounted at one end, an actuating thermostatic element mounted on said compensating thermostatic element for normally restraining said control member in the first of said two positions, said thermostatic elements being arranged to move in opposite directions in response to ambient temperature changes thereby to prevent said actuating thermostatic element from moving to permit said control member to move from said first to said second position; and means for heating said actuating thermostatic element thereby to move said element to permit said control member to move from said first to said second position.

JOHN L. WOODWORTH.